(12) United States Patent
Asami et al.

(10) Patent No.: US 6,326,453 B2
(45) Date of Patent: Dec. 4, 2001

(54) PROCESS FOR PRODUCING PHENOL RESIN

(75) Inventors: Masakatsu Asami, Yaizu; Yoshikazu Kobayashi, Fujieda, both of (JP)

(73) Assignee: Sumitomo Durez Company, Ltd., Tokyo (JP)

( * ) Notice: Subject to any disclaimer, the term of this patent is extended or adjusted under 35 U.S.C. 154(b) by 0 days.

(21) Appl. No.: 09/734,734

(22) Filed: Dec. 13, 2000

(30) Foreign Application Priority Data

Dec. 16, 1999 (JP) .................................................. 11-357047
Oct. 19, 2000 (JP) .................................................. 12-318893

(51) Int. Cl.$^7$ .............................. C08G 14/02; C08G 8/04
(52) U.S. Cl. ........................................... 528/141; 527/137
(58) Field of Search ............................................... 528/141

(56) References Cited

U.S. PATENT DOCUMENTS 3,988,386   10/1976   Hesse et al. .
5,859,153 * 1/1999   Kirk et al. ............................ 528/141
5,864,003 * 1/1999   Qureshi et al. ...................... 528/141

FOREIGN PATENT DOCUMENTS 0 789 041 A1   8/1997   (EP) .
1 076 069 A2   2/2001   (EP) .
08-067728      3/1996   (JP) .

OTHER PUBLICATIONS

Condensed Chemical Dictionary, 8th Ed., p. 631, Jul. 1971.*

* cited by examiner

Primary Examiner—Morton Foelak
(74) Attorney, Agent, or Firm—Smith, Gambrell & Russell, LLP

(57) ABSTRACT

A novolak-type phenol resin with less unreacted phenol and a narrow molecular weight distribution is produced in high yield by reaction of a phenol with an aldehyde using an organophosphonic acid as a catalyst, while keeping a water concentration of reaction system at not more than 30% by weight and a reaction temperature at 110° C.–200° C.

5 Claims, 1 Drawing Sheet

PROCESS FOR PRODUCING PHENOL RESIN

INTRODUCTION AND BACKGROUND

The present invention relates to a process for producing a novolak type phenol resin with less unreacted phenol and a narrow molecular weight distribution in high yield. The novolak-type phenol resin produced according to the present invention is used as a suitable binder for molding materials, friction materials, grinding materials, sealants, etc.

Heretofore, a novolak-type phenol resin has been obtained by reaction of a phenol with an aldehyde, using an inorganic or organic acid such as hydrochloric acid, sulfuric acid, phosphoric acid, phosphorous acid, oxalic acid, p-toluenesulfonic acid, etc. as a catalyst. A novolak-type phenol resin can be adjusted in the molecular weight generally by changing a charge ratio of a phenol to an aldehyde, etc. but has a broader molecular weight distribution. The ordinary means for narrowing the molecular weight distribution includes a method of conducting the reaction in an organic solvent and a method of removing low-molecular weight components by steam distillation or solvent washing. In the case of the former method, no low-molecular weight novolak-type phenol resin can be obtained, whereas in the case of the latter method, the yield is considerably lowered.

An object of the present invention is to produce a novolak-type phenol resin with less unreacted phenols and a narrow molecular weight distribution in high yield.

SUMMARY OF THE INVENTION

As a result of extensive studies to attain the object, the present inventors have found a process for producing a novolak-type phenol resin, which comprises conducting reaction of a phenol with an aldehyde by use of an organo-phosphonic acid as a catalyst and have established the present invention.

According to a preferable mode of the present invention, reaction of a phenol with an aldehyde is carried out by keeping a water concentration of reaction system at not more than 30% by weight and a reaction temperature at 110°–200° C.

According to another preferable mode of the present invention, an organophosphonic acid represented by the following general formula (1) is used:

$$R\text{—}PO(OH)_2 \qquad (1)$$

where R is a group containing carbon atoms and at least one of —COOH and —PO(OH)$_2$.

DETAILED DESCRIPTION OF INVENTION

Figure 1:
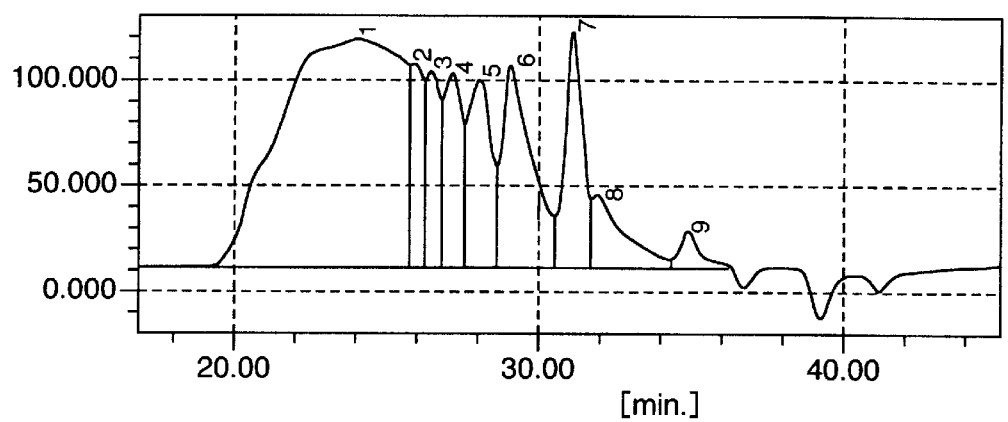
FIG. 1 is a liquid chromatographic chart of the novolak-type phenol resin obtained in Example 1.

The phenol for use in the present invention is not particularly limited, and preferably includes at least one of phenols selected from phenol, ortho-cresol, metha-cresol, para-cresol, xylenol, para-t-butylphenol, para-octylphenol, para-phenylphenol, bisphenol A, bisphenol F, resorcinol, etc.

The aldehyde for use in the present invention is not particularly limited, and preferably includes formaldehyde, acetaldehyde, butyraldehyde, acrolein, etc. or mixtures thereof. Materials serving as a source for generating such an aldehyde or solutions of such an aldehyde can be also used.

Molar ratio of phenol to aldehyde as reactants is 1.0:0.1–3.0, preferably 0.5–1.0. All the amounts of phenol and aldehyde can be charged in one lump before the start of reaction, and then the catalyst can be added thereto to start the reaction, or in order to suppress heat generation at the initial stage of reaction, phenol and the catalyst can be charged at first and then aldehyde can be consecutively added thereto to start the reaction.

The organophosphonic acid as a catalyst for use in the present invention is an organic compound containing a phosphono group-PO(OH)$_2$ and is not particularly limited, but the organo-phosphonic acid represented by the following general formula (1) is preferable from the viewpoint of producing novolak-type phenol resin with less unreacted phenol and a narrow molecular weight distribution in high yield:

$$R\text{—}PO(OH)_2 \qquad (1)$$

where R is a group containing carbon atoms and at least one of —COOH and —PO(OH)$_2$.

The oranophosphonic acid represented by the general formula (1) includes aminopolyphosphonic acids such as ethylenediamine tetrakismethylenephosphonic acid, ethylenediaminebismethylenephosphonic acid, aminotrimethylenephosphonic acid, β-aminoethylphosphono-N,N-diacetic acid and aminomethylphosphono-N,N-diacetic acid, and 1-hydroxyethylidene-1,1'-diphosphonic acid, 2-phosphonobutane-1,2,4-tricaroxylic acid, etc. From the viewpoint of the object of the present invention, aminotrimethylenephosphonic acid, 1-hydroxyethylidene-1,1'-diphosphonic acid and 2-phosphonobutane-1,2,4-tricarboxylic acid, which can be commercially produced in bulk at a low cost, are preferable.

0.001–4.0 parts by mole, preferably 0.01–0.5 parts by mole, of organophosphonic acid is added to one part by mole of phenol. The higher the amount of organophosphonic acid, the more remarkable the effect of the present invention, i.e. on the production of a novolak-type phenol resin with less unreacted phenol and a narrow molecular weight distribution in high yield. Even if the catalyst amount exceed 4.0 parts by mole, the effect can be no more increased, whereas below 0.001 parts by mole, the catalyst effect is substantially lost.

An acid usually used in the production of a novolak-type phenol resin, such as oxalic acid, sulfuric acid, hydrochloric acid, p-toluenesulfonic acid, etc. can be used at the same time. Simultaneous use of such an acid is effective particularly for reaction promotion in the higher molecular weight region such as 4- or higher nucleus members, and thus can be regarded as an effective means for controlling the molecular weight distribution.

In the present process for producing a novolak-type phenol resin, reaction conditions of keeping a water concentration of reaction system at not more than 30% by weight and a reaction temperature at 110–200° C. are effective for selective reaction of not only unreacted phenol but also a novolak-type phenol resin in the low molecular weight region such as 2- and 3-nucleus members and thus are conditions for effectively narrowing the molecular weight distribution. In other words, reaction of unreacted phenol can be readily carried out even under conditions outside the above-mentioned reaction conditions, i.e. at a higher water concentration and a lower temperature, but the selective reaction in the low molecular weight region such as 2- and 3-nucleus members is not satisfactory and the molecular weight distribution tends to be broadened.

Water concentration of reaction system in the present invention is a proportion of water to total amount of phenol, aldehyde, novolak-type phenol resin, organophosphonic acid, etc. present in the reaction system. Water includes water added at the charging, water derived from the charged raw materials such as water contained in the added aldehyde, water contained in the added organophosphonic acid, and water of crystallization in the organophosphonic acid, water of condensation formed by the reaction, etc. A concentration of these kinds of water present in the reaction system is not more than 30% by weight, preferably 1–20% by weight.

Water concentration of reaction system can be calculated by dividing total amount of the water contained in the charged raw materials and the water of condensation formed by the reaction in the reaction system by total amount of all the charged materials. When the reaction is carried out while removing water by distillation, a water concentration of reaction system is calculated on the basis of the amount of water obtained by subtracting the amount of distilled water from the total amount of the water in the charged raw materials and the water of condensation formed by the reaction.

The lower the water concentration, the higher the effect on the production of a novolak-type phenol resin with less unreacted phenol and a narrow molecular weight distribution in high yield. Thus, not more than 20% by weight is preferable. However, at too low a water concentration, the organophosphonic acid becomes highly viscous or solidified, lowering the catalytic effect. Therefore, not less than 1% by weight, i.e. a water concentration nearly corresponding to the content of water of crystallization, is preferable. When the water concentration exceeds 30% by weight, the effect will be no more increased.

In the present invention, the reaction temeprature is preferably 110°–200° C. Below 110° C., the catalyst organophosphonic acid becomes highly viscous or solidified under the above-mention condition of low water concentration, lowering the catalytic effect, whereas above 200° C. decomposition of organophosphonic acid and novolak-type phenol resin will take place. Decomposition of organophosphonic acid and novolak-type phenol resin will take place less at a low temperature, and a temperature range for obtaining the satisfactory catalyst effect without becoming highly viscous and solidified at a water concentration of 1–20% by weight is 130°–160° C.

In the reaction under the atmospheric pressure, the reflux temperature nearly corresponds to 110°–200° C. at a water concentration of not more than 30% by weight, and thus the reaction under the atmospheric pressure is a preferable condition for controlling the temperature and water concentration. Other conceivable reaction conditions include solvent reflux dehydration reaction using a non-aqueous solvent such as butanol, propanol, etc., high pressure reaction, etc.

Furthermore, conditions of removing formed water of condensation by distillation, etc. while adding an aldehyde are preferable because the water concentration of reaction system can be kept constant, but attention must be paid to such a disadvantage that the unreacted phenol is likely to be removed together with water by the distillation.

To overcome such a disadvantage, the reaction is carried out so that the unreacted phenol may not be distilled away until the unreacted phenol reaches a predetermined amount or less, and then after or while removing water by distillation the reaction is continued while keeping the water concentration at not more than 30% by weight and the reaction temperature at 110° C.–200° C.

After the reaction, neutralization and water washing can be carried out for the catalyst removal. If required, atmospheric distillation, subatmospheric distillation, steam distillation, etc. can be also carried out for removal of water, organic solvent or even unreacted phenol.

The reason why a novolak-type phenol resin with a narrow molecular weight distribution can be produced in high yield by the present invention, using an organophosphonic acid as a catalyst seems to be based on the following facts.

The organophosphonic acid for use in the present invention has such properties as a very high solubility in water with easy hydration, a low solubility in phenol and a lower solubility in novolak-type phenol resin which tends to decrease with its increasing molecular weight. Thus, phase separation takes place during the reaction. That is, an aqueous phase rich in the organophosphonic acid as a catalyst is separated from an organic phase comprising phenol and novolak-type phenol resin, substantially free from the catalyst. Phenol and low molecular weight components such as 2-nucleus members are more liable to dissolve in the aqueous phase and the dissolved matters will react with aldehyde. But no substantial dissolution in the aqueous phase takes place in the high molecular weight region and consequently no reaction proceeds. The reacted novolak-type phenol resin by dissolution in the aqueous phase is quickly extracted into the organic phase and no further reaction proceeds.

In this manner, there is a difference in reaction rate between the low molecular weight region and the high molecular weight region, resulting in production of a novolak-type phenol resin with less unreacted phenol and a narrow molecular weight distribution in high yield.

The present invention is characterized by using an organophosphonic acid as a catalyst and preferably by keeping a water concentration of reaction system at not more than 30% by weight and a reaction temperature at 110°–200° C. as reaction conditions. Reason why a novolak-type phenol resin with less unreacted phenol and a narrow molecular weight distribution can be produced in high yield in the preferable mode of the present invention seems to be based on the following facts.

Low water concentration of reaction system, i.e. not more than 30% by weight, and high reaction temperature, i.e. not less than 110° C., can give rise to the following effects.

First, the high reaction temperature makes even the low molecular weight region of 2- and 3-nucleus members easily dissolve into the aqueous phase, enabling the reaction to easily proceed in the aqueous phase. The water concentration of reaction system is kept low and the ionic concentration of the aqueous phase is kept high. Thus, the boundary between the aqueous phase and the organic phase can be maintained to distinctly separate the phases from each other, thereby preventing reaction in the organic phase. Organophosphonic acid at a high concentration has an increased viscosity and a solidifying tendency, but the high reaction temperature can keep the organophosphonic acid in a molten state, thereby preventing loss of catalytic function. Due to these effects, a novolak-type phenol resin with less unreacted phenol and a narrow molecular weight distribution can be effectively produced in high yield.

The present invention will be described in detail below, by means of Examples and Comparative Examples, where "parts" and "%" are all by weight.

EXAMPLE 1

1,000 parts of phenol and 200 parts of an aqueous 60% 1-hydroxyethylidene-1,1'-diphosphonic acid solution (Feliox 115, product manufactured by Lion Corp.) were added to a 3-l three-necked flask, followed by heating up to 100° C. Then, 700 parts of an aqueous 35% formaldehyde solution was consecutively added thereto over 30 minutes, and the resultant mixture was subjected to reaction at 100° C. for one hour with refluxing. Then, the reaction mixture was subjected to atmospheric distillation followed by heating up to 130° C. and then to subatmospheric distillation under reduced pressure of 5,000 Pa followed by heating up to 150° C., whereby 1,192 parts of phenol resin A was obtained.

EXAMPLE 2

1,000 parts of phenol and 240 parts of an aqueous 50% aminotrimethylenephosphonic acid solution (Diquest 2000, product manufactured by Solucia Japan K.K.) were added to a 3-l three three-necked flask, followed by heating up to 100° C. Then, 700 parts of an aqueous 35% formaldehyde solution was consecutively added thereto over 30 minutes and the resultant mixture was subjected to reaction at 100° C. for one hour with refluxing. Then, the reaction mixture was subjected to atmospheric distillation followed by heating up to 130° C. and then to subatmospheric distillation under reduced pressure of 5,000 Pa followed by heating up to 150° C., whereby 1,178 parts of phenol resin B was obtained.

Comparative Example 1

1,000 parts of phenol and 10 parts of oxalic acid were added to a 3-l three-necked flask, followed by heating up to 100° C. Then, 700 parts of an aqueous 35% formaldehyde solution was consecutively added thereto over 30 minutes, and the resultant mixture was subjected to reaction at 100° C. for one hour with refluxing. Then, the reaction mixture was subjected to atmospheric distillation followed by heating up to 130° C. and then to subatmospheric distillation under reduced pressure of 5,000 Pa followed by heating up to 190° C., whereby 957 parts of phenol resin I was obtained.

EXAMPLE 3

1,000 parts of phenol and 200 parts of an aqueous 60% 1-hydroxyethylidene-1,1'-diphosphonic acid solution (Feliox 115, product manufactured by Lion Corp.) were added to a 3-l three-necked flask, followed by heating up to 100° C. Then, 690 parts of an aqueous 37% formaldehyde solution was consecutively added thereto over 30 minutes and the resultant mixture was subjected to reaction at 100° C. for one hour with refluxing. After the reaction, the reaction mixture was sampled to quantitatively determine unreacted phenol by gas chromatography. Then, 500 parts of pure water was added thereto, and the aqueous phase separated from the resin was removed. This water washing process was carried out three times. Then, the washed reaction mixture was subjected to atmospheric distillation followed by heating up to 130° C. and then to subatmospheric distillation under reduced pressure of 5,000 Pa followed by heating up to 150° C., whereby 1,056 parts of phenol resin C was obtained.

EXAMPLE 4

1,000 parts of phenol and 240 parts of an aqueous 50% aminotrimethylenephosphonic acid solution (Diquest 2000, product manufactured by Solucia Japan K.K.) were added to a 3-l three-necked flask, followed by heating up to 100° C. Then, 690 parts of an aqueous 37% formaldehyde solution was consecutively added thereto over 30 minutes, and the resultant mixture was subjected to reaction at 100° C. for one hour with refluxing. After the reaction, the reaction mixture was sampled to quantitatively determine unreacted phenol by gas chromatography. Then, 500 parts of pure water was added thereto, and the aqueous phase separated from the resin was removed. This water washing process was carried out three times. Then, the washed reaction mixture was subjected to atmospheric distillation followed by heating up to 130° C. and then to subatmospheric distillation under reduced pressure of 5,000 Pa followed by heating up to 150° C., whereby 1,052 parts of phenol resin D was obtained.

EXAMPLE 5

1,000 parts of phenol and 240 parts of an aqueous 50% 2-phosphonobutane-1,2,4-tricarboxylic acid solution (PBTC, product manufactured by Johoku Kagaku K.K.) were added to a 3-l three-necked flask, followed by heating up to 100° C. Then, 690 parts of an aqueous 37% formaldehyde solution was consecutively added thereto over 30 minutes and the resultant mixture was subjected to reaction at 100° C. for one hour with refluxing. After the reaction, the reaction mixture was sampled to quantitatively determine unreacted phenol by gas chromatography. Then, 500 parts of pure water was added thereto, and the aqueous phase separated from the resin was removed. This water washing process was carried out three times. Then, the washed reaction mixture was subjected to atmospheric distillation followed by heating up to 130° C. and then to subatmospheric distillation under reduced pressure of 5,000 Pa followed by heating up to 150° C., whereby 1,047 parts of phenol resin E was obtained.

EXAMPLE 6

1,000 parts of an aqueous 60% 1-hydroxyethylidene-1,1-diphosphonic acid solution (Feliox 115, product manufactured by Lion Corp) and 1,000 parts of phenol were added to a 3-l three-necked flask, followed by heating up to 100° C. Then, 690 parts of an aqueous 37% formaldehyde solution was consecutively added thereto over one hour and the resultant mixture was subjected to reaction at 100° C. for one hour with refluxing. After the reaction, the reaction mixture was sampled to quantitatively determine unreacted phenol by gas chromatography. Then, 500 parts of pure water was added thereto, and the aqeuous phase separated from the resin was removed. This water washing process was carried out three times. Then, the washed reaction mixture was subjected to atmospheric distillation followed by heating up to 130° C. and then to subatmospheric distillation under reduced pressure of 5,000 Pa followed by heating up to 150° C., whereby 1,065 parts of phenol resin F was obtained.

EXAMPLE 7

1,000 parts of phenol and 600 parts of 1-hydroxyethylidene-1,1-diphosphonic acid (1-hydroxyethylidene-1,1'-diphosphonic acid (monohydrate) purity: 95% or higher; product manufactured by Kishida Kagaku K.K.) were added to a 3-l three-necked flask, followed by heating up to 140° C. Then, 277.5 parts of 92% paraformaldehyde was consecutively added thereto over 30 minutes and the resultant mixture was subjected to reaction at 126° C. for one hour with refluxing. Water concentration of reaction system was 2% at the initial reaction stage and 12% at the end of reaction. After the reaction, the reaction mixture was sampled to quantitatively determine unreacted phenol by gas chromatography. Then, 500 parts of pure water was added thereto, and the aqueous phase separated from the resin was removed. This water washing process was carried out three times. Then, the washed reaction mixture was subjected to atmospheric distillation followed by heating up to 130° C. and to subatmospheric distillation under reduced pressure of 5,000 Pa followed by heating up to 150° C., whereby 1,076 parts of phenol resin G was obtained.

EXAMPLE 8

1,000 parts of an aqueous 60% 1-hydroxyethylidene-1,1'-diphosphonic acid solution (Feliox 115, product manufactured by Lion Corp.) was added to a 3-l three-necked flask and subjected to atmospheric distillation to increase the concentration to 80%. Then, 1,000 parts of phenol was added thereto, followed by heating up to 100° C. and consecutive addition of 550 parts of an aqueous 37% formaldehyde solution thereto over 30 minutes. Then, the mixture was subjected to atmospheric distillation followed by heating up to 130° C. to adjust a water concentration of reaction system at 6%. Then, 140 parts of an aqueous 37% formaldehyde solution was added thereto over 30 minutes during atmospheric distillation while keeping the temperature at 130° C. and the water concentration of reaction system constantly at about 6%. Phenol loss by distillation was found to be 0.3% on the basis of the charged phenol. Then, the reaction was carried out at 140° C. for one hour with refluxing. After the reaction, the reaction mixture was sampled to quantitatively determine unreacted phenol by gas chromatography. Then, 500 parts of pure water was added thereto, and the aqueous phase separated from the resin was removed. This water washing process was carried out three times. The washed reaction mixture was subjected to atmospheric distillation followed by heating up to 130° C. and then to subatmospheric distillation under reduced pressure of 5,000 Pa followed by heating up to 150° C., whereby 1,074 parts of phenol resin H was obtained.

Comparative Example 2

1,000 parts of phenol and 10 parts of oxalic acid were added to a 3-l three-necked flask, followed by heating up to 100° C. Then, 690 parts of an aqueous 37% formaldehyde solution was consecutively added thereto and the reductant mixture was subjected to reaction at 100° C. for one hour with refluxing. After the reaction, the reaction mixture was sampled to quantitatively determine unreacted phenol by gas chromatography. Then, the reaction mixture was subjected to atmospheric distillation followed by heating up to 130° C. and then to subatmospheric distillation under reduced pressure of 5,000 Pa followed by heating up to 190° C., whereby 957 parts of phenol resin J was obtained.

Comparative Example 3

1,000 parts of phenol and 10 parts of oxalic acid were added to a 3-l three-necked flask, followed by heating up to 100° C. Then, 690 parts of an aqueous 37% formaldehyde solution was consecutively added thereto over 30 minutes and the resultant mixture was subjected to reaction at 100° C. for one hour with refluxing. After the reaction, the reaction mixture was sampled to quantitatively determine unreacted phenol by gas chromatography. Then, 500 parts of pure water was added thereto, and the aqueous phase separated from the resin was removed. This water washing process was carried out three times. Then, the washed reaction mixture was subjected to atmospheric distillation followed by heating up to 130° C. and then to subatmospheric distillation under reduced pressure of 5,000 Pa followed by heating up to 150° C., whereby 972 parts of phenol resin K was obtained.

Figure 2:
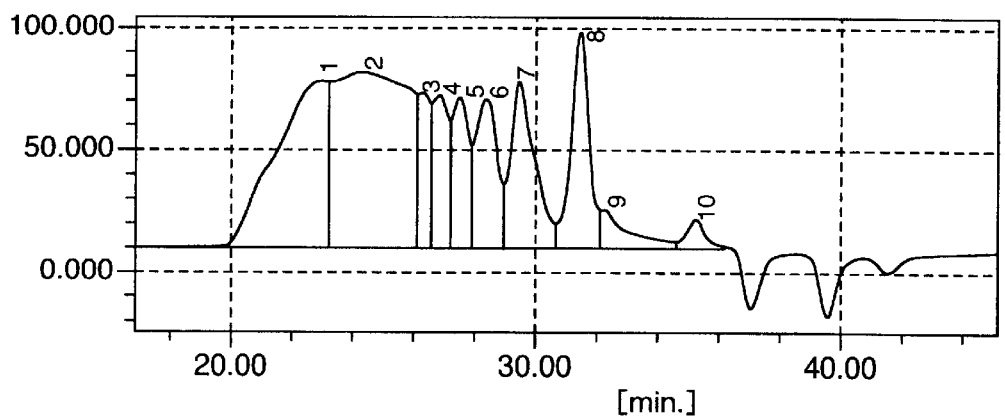
FIG. 2 is a liquid chromatographic chart of the novolak-type phenol resin obtained in Example 2.
Figure 3:
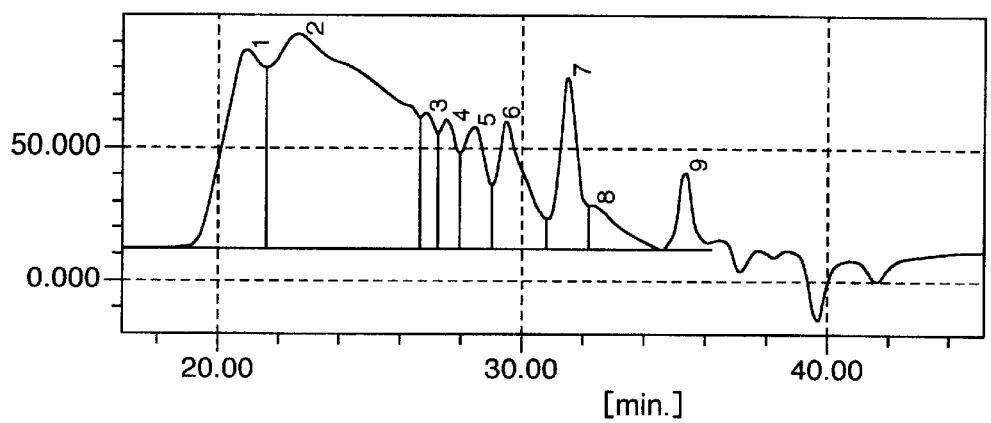
FIG. 3 is a liquid chromatographic chart of the novolak-type phenol resin obtained in Comparative Example 1.

Characteristics of the phenol resins obtained in Examples 1 and 2 and Comparative Example 1 are shown in Table 1 and their liquid chromatographic charts are shown in FIGS. 1–3, respectively.

Characteristics of the phenol resins obtained in Examples 3–8 and Comparative Examples 2 and 3 are shown in Table 2.

Characteristics shown in Tables 1 and 2 were determined in the following manner:

1. Resin yield: Parts of phenol resin produced on the basis of 1,000 parts of charged phenol.
2. Number average molecular weight (Mn) and weight average molecular weight (Mw): determined by liquid chromatography.
3. Unreacted phenol content: determined by gas chroamtography.

Gas chromatography: internal standard method according to JIS K0114, using 2,5-xylenol as an internal standard substance.

4. Softening point: determined according to JIS K-2531.
5. Kinetic viscosity in 50% ethanol solution: determined in 50% ethanol solution at 25° C., using a Cannon-Fenske viscometer.
6. 2-nucleus member content: determined from chart area ratio obtained by liquid chromatography.

Liquid chromatography: determined by GPC, using GPC columns (one G1000XL column, two G2000HXL columns and one G3000HXL column) manufactured by Tosoh Corp. with tetrahydrofuran as an eluent solvent at a flow rate of 1.0 ml/min. and a column temperature of 40° C. and with a differential refractometer as a detector.

In Examples 1 and 2 and Comparative Example 1, molecular weights were determined by means of an approximation straight line plotted along peak 3 (peak position of 7-nucleus member), peak 7 (peak position of 3-nucleus member) and peak 10 (peak position of phenol) in FIG. 2 showing a liquid chromatographic chart according to Example 2, on the assumption that their molecular weights are 730, 306 and 94, respectively. In Examples 3–8 and Comparative Examples 2 and 3, molecular weights were determined in terms of standard polystyrene.

TABLE 1

| Resin | A (Ex. 1) | B (Ex. 2) | I (Comp. Ex. 1) |
|---|---|---|---|
| Resin yield (parts) | 1192 | 1178 | 957 |
| Number average molecular weight (Mn) | 530 | 520 | 590 |
| Weight average molecular weight (Mw) | 1097 | 1083 | 1424 |
| Molecular weight distribution (Mw/Mn) | 2.1 | 2.1 | 2.4 |
| Unreacted phenol (%) | 1.2 | 1.4 | 2.3 |

TABLE 2

| | C (Ex. 3) | D (Ex. 4) | E (Ex. 5) | F (Ex. 6) | G (Ex. 7) | H (Ex. 8) | J (Comp. Ex. 2) | K (Comp. Ex. 3) |
|---|---|---|---|---|---|---|---|---|
| Resin yield (parts) | 1056 | 1052 | 1047 | 1065 | 1076 | 1074 | 957 | 972 |
| Unreacted phenol after reflux reaction (%) | 1.5 | 2.5 | 2.9 | 0.7 | 0.0 | 0.0 | 7.6 | 7.5 |
| Number average molecular weight (Mn) | 583 | 572 | 496 | 550 | 600 | 616 | 1264 | 1203 |
| Weight average molecular weight (Mw) | 1547 | 1516 | 1325 | 1163 | 930 | 790 | 8263 | 8125 |

TABLE 2-continued

| | C (Ex. 3) | D (Ex. 4) | E (Ex. 5) | F (Ex. 6) | G (Ex. 7) | H (Ex. 8) | J (Comp. Ex. 2) | K (Comp. Ex. 3) |
|---|---|---|---|---|---|---|---|---|
| Molecular weight distribution (Mw/Mn) | 2.65 | 2.65 | 2.67 | 2.12 | 1.55 | 1.28 | 6.51 | 6.75 |
| Softening point (° C.) | 100 | 99 | 98 | 98 | 93 | 96 | 103 | 99 |
| Kinetic viscosity in 50% ethanol solution (25° C. μm²/s) | 68 | 67 | 63 | 66 | 43 | 43 | 122 | 108 |
| Unreacted phenol (%) | 1.1 | 1.9 | 2.0 | 0.5 | 0.0 | 0.0 | 1.8 | 4.7 |
| 2-nucleus member content (%) | 12.1 | 12.1 | 10.5 | 9.9 | 6.0 | 2.5 | 13.1 | 13.0 |

As evident from the results shown in Tables 1 and 2, novolak-type phenol resins obtained in Examples 1–8 have norrower molecular weight distributions, less unreacted phenol and higher yields than those of Comparative Examples 1–3. Furthermore, as evident from the results shown in Table 2, phenol resins obtained in Examples 7 and 8 have narrower molecular weight distributions, less unreacted phenol and higher yields than that obtained in Example 6.

As described in the foregoing, a novolak-type phenol resin with less unreacted phenol and a narrow molecular weight distribution can be obtained in high yield in the present invention.

What is claimed is:

1. A process for producing a novolak phenol resin, which comprises conducting reaction of a phenol with an aldehyde by use of an organophosphonic acid as a catalyst.

2. A process according to claim 1, wherein the reaction is conducted while keeping a water concentration of reaction system at not more than 30% by weight and a reaction temperature at 110° C.–200° C.

3. A process according to claim 1, wherein the organophosphonic acid is represented by the following general formula (1):

$$R\text{—}PO(OH)_2 \qquad (1)$$

where R is a group containing carbon atoms and at least one of —COOH and —PO(OH)$_2$.

4. A process according to claim 2, wherein the organophosphonic acid is represented by the following general formula (1):

$$R\text{—}PO(OH)_2 \qquad (1)$$

where R is a group containing carbon atoms and at least one of —COOH and —PO(OH)$_2$.

5. A phenol resin produced by the process according to claim 1.

* * * * *